(12) United States Patent
Sakai et al.

(10) Patent No.: US 7,007,550 B2
(45) Date of Patent: Mar. 7, 2006

(54) SEMICONDUCTOR DYNAMIC QUANTITY SENSOR

(75) Inventors: Minekazu Sakai, Kariya (JP); Takashi Katsumata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/806,278

(22) Filed: Mar. 23, 2004

(65) Prior Publication Data

US 2004/0187573 A1 Sep. 30, 2004

(30) Foreign Application Priority Data

Mar. 27, 2003 (JP) .............................. 2003-088877

(51) Int. Cl.
*G01P 15/10* (2006.01)
*G01P 15/125* (2006.01)

(52) U.S. Cl. ................... 73/514.29; 73/514.32

(58) Field of Classification Search ............ 73/514.32, 73/514.29, 514.16, 514.38, 514.36, 504.04, 73/504.12, 504.14, 504.15

See application file for complete search history.

(56) References Cited

U.S. PATENT DOCUMENTS

| 5,728,936 A | 3/1998 | Lutz |
| 5,880,369 A | 3/1999 | Samuels et al. |
| 6,151,966 A | 11/2000 | Sakai et al. |
| 6,201,284 B1 | 3/2001 | Hirata et al. |
| 6,214,243 B1 * | 4/2001 | Muenzel et al. ............... 216/2 |
| 6,539,803 B1 * | 4/2003 | Mochida .................. 73/504.12 |
| 6,796,180 B1 * | 9/2004 | Katsumata ............... 73/504.14 |

FOREIGN PATENT DOCUMENTS

| JP | A-7-245413 | 9/1995 |
| JP | A-2001-4658 | 1/2001 |
| JP | A-2003-202226 | 7/2003 |

* cited by examiner

*Primary Examiner*—Helen C. Kwok
(74) *Attorney, Agent, or Firm*—Posz Law Group, PLC (57) ABSTRACT

In a semiconductor dynamic quantity sensor, a mass serving as a weight portion for detecting application of a dynamic quantity is divided into three masses (301, 302, 303) in series. The masses (301, 302, 303) thus divided are connected to one another by connecting beams (CB1, CB2, CB3, CB4). The masses (301, 302, 303) located at both the end portions are supported through beams (B1, B2, B3, B4) by a semiconductor substrate (1) so as to be allowed to be displaced in the direction orthogonal to the connection direction of the masses. The center mass (302) connected to the masses (301, 302, 303) through the connecting beams (CB1, CB2, CB3, CB4) is allowed to be displaced only in the connecting direction of the masses by the connecting beams (CB1, CB2, CB3, CB4).

11 Claims, 7 Drawing Sheets

| RESONANCE MODE | FIRST EMBODIMENT | PRIOR ART |
|---|---|---|
| Z DIRECTION | 1.30 (13.0kHz) | 0.34 (3.4kHz) |
| MASS ROTATION | 1.59 (15.9kHz) | 1.32 (13.2kHz) |
| BEAM SURGE | 3.51 (35.1kHz) | 1.92 (19.2kHz) |

SEMICONDUCTOR DYNAMIC QUANTITY SENSOR

CROSS REFERENCE TO RELATED APPLICATION

This application is based upon, claims the benefit of priority of, and incorporates by reference the contents of Japanese Patent Application No. 2003-88877 filed on Mar. 27, 2003.

FIELD OF THE INVENTION

The present invention relates to a semiconductor dynamic quantity sensor that is equipped with a movable portion supported by beams and detects a dynamic quantity such as acceleration, angular velocity or the like.

BACKGROUND OF THE INVENTION

Figure 5A:
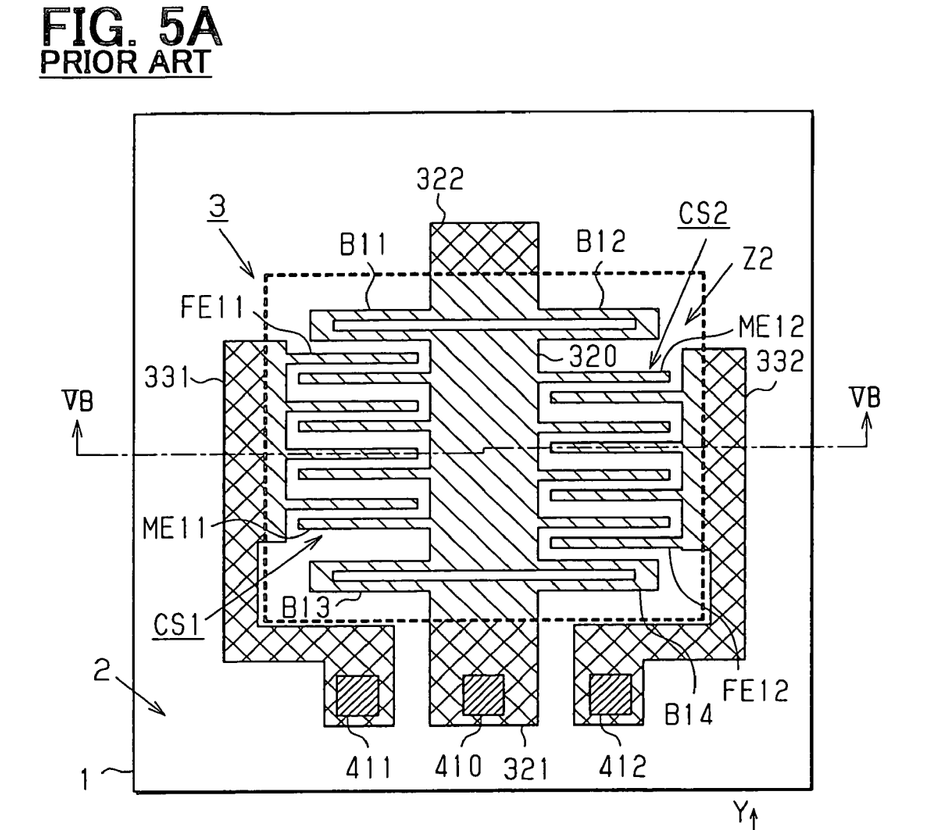
FIG. 5A is a plan view showing the structure of the sensor.
Figure 5B:
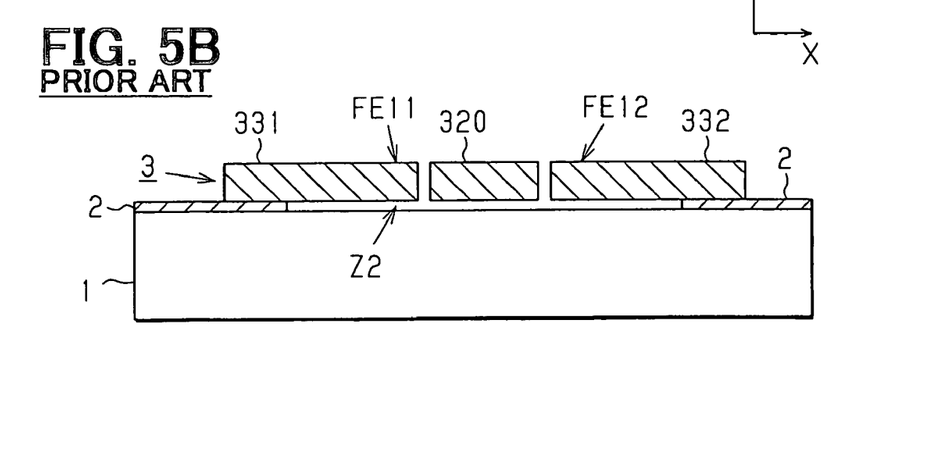
FIG. 5B is a cross-sectional view taken along line VB—VB of FIG. 5B.

A semiconductor dynamic quantity sensor has been disclosed in JP-A-11-326365. FIGS. 5A–5B schematically show the structure of the semiconductor dynamic quantity (acceleration) sensor disclosed in the Patent Document 1. Specifically, FIG. 5A is a plan view of this sensor element, and FIG. 5B is a cross-sectional view taken along a line VB—VB of FIG. 5A.

As shown in FIGS. 5A and 5B, the sensor comprises a semiconductor substrate (silicon substrate) 1, an insulating layer 2 and a semiconductor layer (silicon layer) 3 formed on the insulating layer 2.

The semiconductor layer 3 is patterned in a pattern style as shown in FIG. 5A by a well-known photolithography technique or the like, and the insulating layer 2 is selectively etched and removed in an area Z2 indicated by a broken line of FIG. 5A to form a groove portion. That is, the semiconductor layer 3 is formed so as to be floated from the substrate 1 in the area Z2 corresponding to the groove portion and supported through the insulating layer 2 by the substrate 1 in the other area.

Specifically, a mass (weight portion) 320 derived from the semiconductor layer 3, comb-shaped movable electrodes ME11 and ME12 formed integrally with the mass 320, fixed electrodes FE11 and FE12, each of which is supported at one end thereof so as to confront each movable electrode, and beams B11 to B14 for supporting the mass 320 at one ends thereof are formed within the area Z2. Furthermore, anchor portions 321, 322, 331 and 332 derived from the semiconductor layer 3 are formed out of the area Z2.

The other ends of the respective beams B11 to B14 are supported by the anchor portions 321 and 322, and the fixed electrodes FE11 and FE12 are supported by the anchor portions 331 and 332, respectively. An electrode pad 410 formed of metal such as aluminum or the like is formed on the anchor portion 321 for outputting the potential of the movable electrodes ME11 and ME12. Furthermore, electrode pads 411 and 412 formed of metal such as aluminum or the like are formed on the anchor portions 331 and 332 to supply voltages to the fixed electrodes FE11 and FE12, respectively.

Here, the mass 320 is designed so that the beams B11 to B14 allow displacement of the mass 320 in the Y-axis direction, but restrains displacement in the X-axis direction of the mass 320 as shown in FIG. 5A.

Accordingly, when acceleration is applied to the mass 320 in the Y-axis direction, the movable electrodes ME11 and ME12 integrally formed with the mass 320 together with displacement of the mass 320 in the Y-axis direction are likewise displaced in the Y-axis direction. In this case, the distance between the movable electrode ME11 and the fixed electrode FE11 is increased or reduced while the distance between the movable electrode ME12 and the fixed electrode FE12 is reduced or increased. That is, with this sensor, the variation of the distance between the electrodes as described above is detected as variation of the electrostatic capacitance CS1 or CS2, and the variations of the electrostatic capacitance CS1, CS2 are output as a voltage value through, for example, a switched capacitor circuit shown in FIG. 6. The direction and magnitude of the acceleration applied are detected on the basis of the voltage value thus taken out.

The construction and operation of the switched capacitor circuit will be briefly described with reference to FIGS. 6 and 7.

Figure 6:
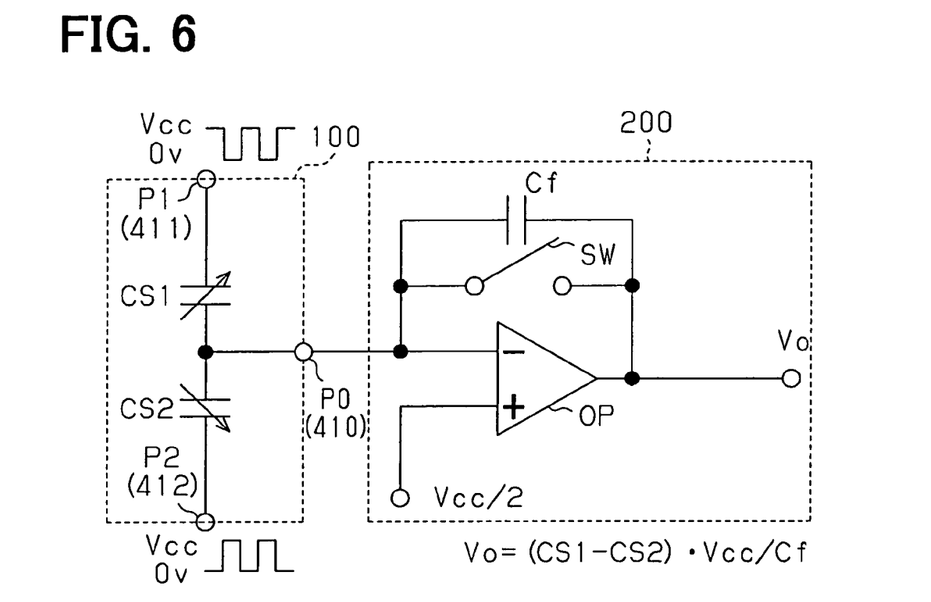
FIG. 6 is a circuit diagram showing the construction of a switched capacitor circuit.

In FIG. 6, reference numeral 100 represents an equivalent circuit of the semiconductor quantity sensor. Reference numeral 200 represents a switched capacitor circuit. Here, a terminal P0 of the circuit 100 corresponds to the electrode pad 410 of the semiconductor quantity sensor, and terminals P1 and P2 correspond to the electrode pads 411 and 412 of the semiconductor quantity sensor, respectively. The potential (charge) output through the terminal P0 (electrode pad 410) is input to the switched capacitor circuit 200.

The switched capacitor circuit 200 comprises an operational amplifier OP, and a capacitor Cf and a switch SW which are connected to each other in parallel in the feedback path of the operational amplifier OP. A signal output from the terminal P0 is input to the inverting input terminal of the operational amplifier OP, and a half voltage of a voltage Vcc applied between the terminals P1 and P2 of the circuit 100 (sensor), that is, a voltage "Vcc/2" is applied to the non-inverting input terminal of the operational amplifier OP.

Next, the operation of the circuits 100 and 200 will be described in combination with the timing chart of FIG. 7.

Figure 7:
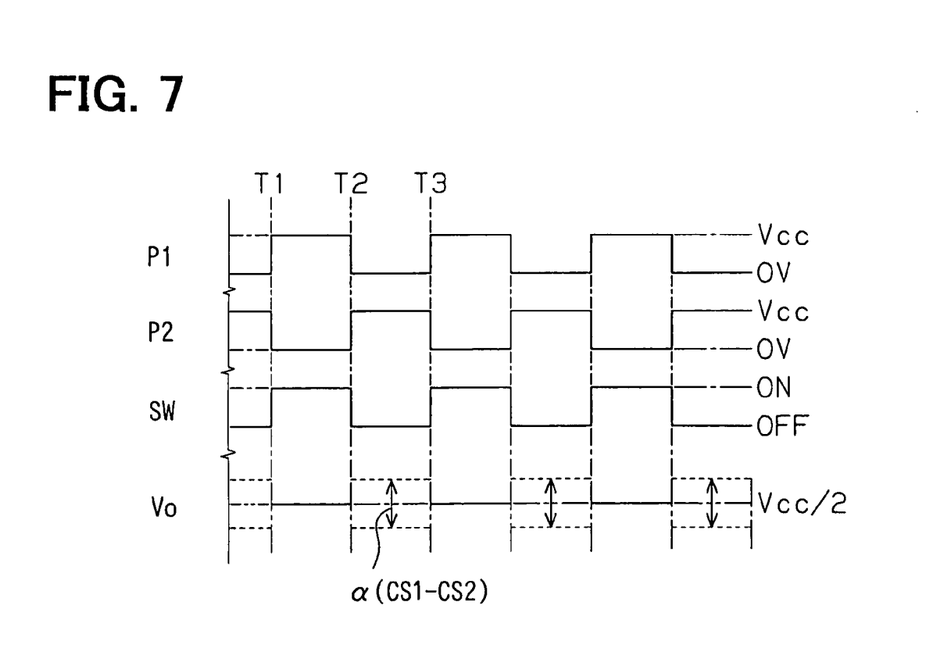
FIG. 7 is a timing diagram showing an example of the operation of the switched capacitor circuit.

As shown in FIG. 7, alternating signals (voltages) each of which alternates between a voltage "0" V and a voltage Vcc, for example, at a frequency of 50 kHz to 150 kHz are stationarily applied to the terminals P1 (electrode pad 411) and P2 (electrode pad 412) of the circuit 100 (sensor) respectively while the alternating signals are opposite in phase to each other. Furthermore, the ON/OFF operation of the switch SW of the switched capacitor circuit 200 is controlled in synchronism with the alternating frequency of each alternating signal (voltage).

Accordingly, for example during the period between the timings T1 and T2, the switch SW is turned on, so that the output voltage Vo of the switched capacitor circuit 200 is maintained at the voltage of "Vcc/2". During the period between the timings T2 and T3, the switch SW is turned off. Therefore, the difference between the variations of the electrostatic capacitance CS1 and CS2 in connection with the application of the acceleration described above, accurately, the difference between the variations in connection with the inversion of the voltage applied between the terminals P1 and P2 is charged in the capacitor of the switched capacitor circuit 200 through the terminal P0. As a result, the output voltage Vo from the switched capacitor circuit 200 is represented as follows:

$$Vo = (CS1 - CS2) \cdot Vcc / Cf$$

Accordingly, the output voltage Vo has the potential corresponding to the capacitance difference (CS1−CS2) of the electrostatic capacitance CS1 and the electrostatic capacitance CS2 as indicated.

The output voltage Vo is properly sampled while the operation as described above is repeated, and only low-frequency components of, for example, 500 Hz or less are extracted from the sampling values, thereby achieving the value corresponding to the acceleration applied to the sensor.

Figure 8A:
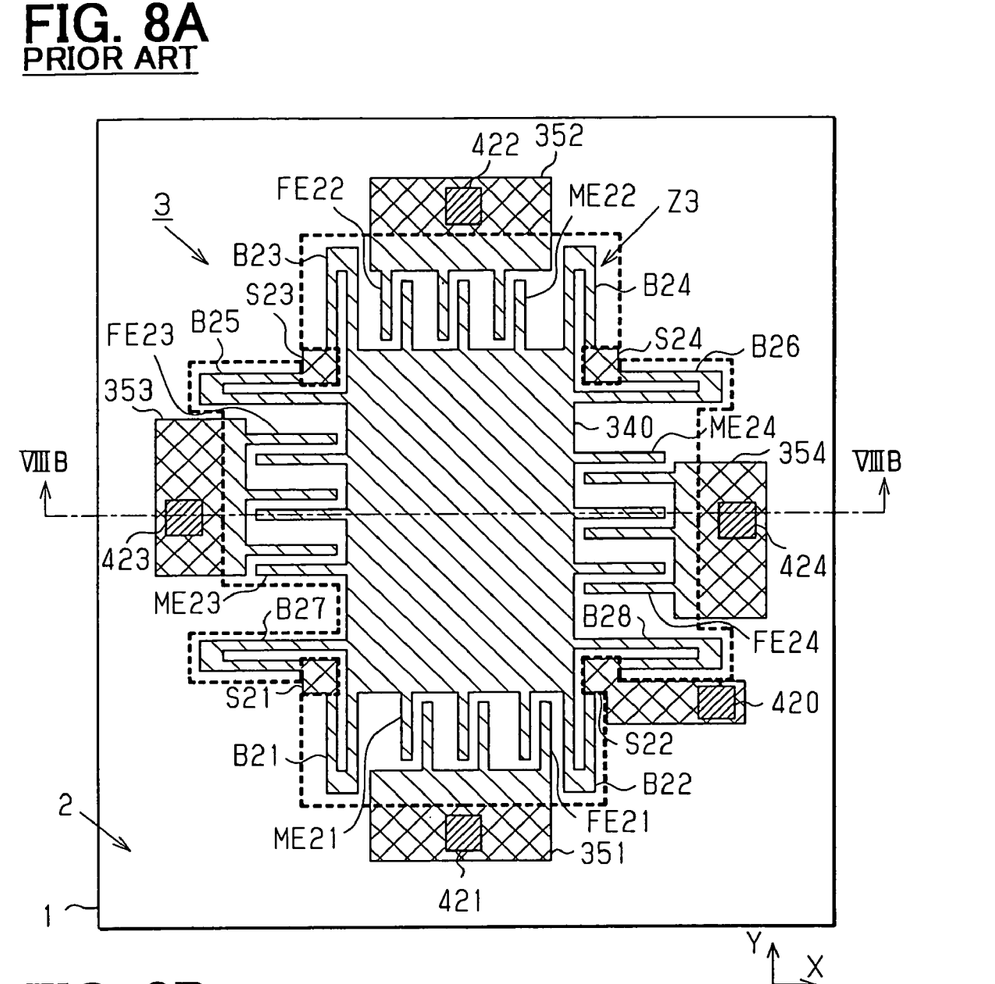
FIG. 8A is a plan view showing the structure of the sensor and FIG. 8B is a cross-sectional view taken along line VIIIB—VIIIB of FIG. 8B.
Figure 8B:
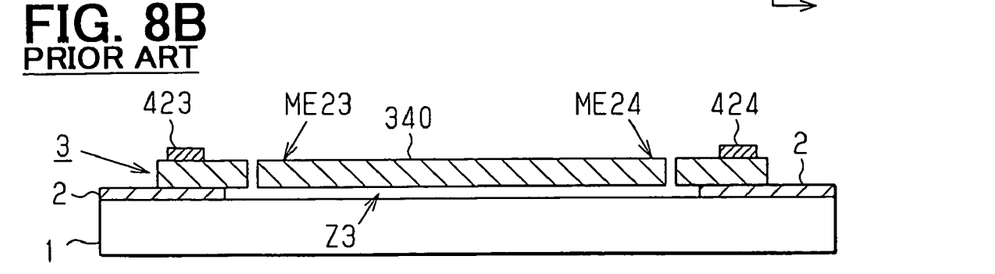

In addition to the sensor for detecting application of a dynamic quantity (acceleration) in one axis direction (uniaxial direction) as described above, a sensor for detecting application of a dynamic quantity (acceleration) in two orthogonal axis directions (biaxial directions) as disclosed in U.S. Pat. No. 5,880,369 (See FIG. 4 of this Patent) has been disclosed. FIGS. 8A and 8B schematically show the structure of a semiconductor dynamic quantity (acceleration) disclosed in U.S. Pat. No. 5,880,369 (FIG. 4). FIG. 8A is a plan view showing this sensor element, and FIG. 8B is a cross-sectional view taken along a line VIIIB—VIIIB.

As shown in FIGS. 8A and 8B, this sensor also comprises a semiconductor substrate (silicon substrate) 1, an insulating layer 2 and a semiconductor layer (silicon layer) 3 formed on the insulating layer 2.

The semiconductor layer 3 is patterned in a pattern style as shown in FIG. 8A by a well-known photolithography technique or the like, and the insulating layer 2 is selectively etched and removed in an area Z3 indicated by a broken line of FIG. 8A to form a groove portion. That is, the semiconductor layer 3 is formed so as to be floated from the substrate 1 in the area Z3 corresponding to the groove portion and supported through the insulating layer 2 by the substrate 1 in the other area.

Specifically, a mass (weight portion) 340 derived from the semiconductor layer 3, comb-shaped movable electrodes ME21 to ME24 formed integrally with the mass 340, fixed electrodes FE21 to FE24, each of which is supported at one end thereof so as to confront each movable electrode, and beams B21 to B28 for supporting the mass 340 at one ends thereof are formed within the area Z3. Furthermore, beam fixing portions S21 to S24 and anchor portions 351 to 354 derived from the semiconductor layer 3 are formed out of the area Z3.

The other ends of the respective beams B21 to B28 are supported by the beam fixing portions S21 to S24, and the fixed electrodes FE21 to FE 24 are supported by the anchor portions 351 to 354, respectively. An electrode pad 420 formed of metal such as aluminum or the like is formed on the beam fixed portion S22 to output the potential of the movable electrodes ME21 to ME24. Furthermore, electrode pads 421 to 424 formed of metal such as aluminum or the like are formed on the anchor portions 351 to 354 to supply voltages to the fixed electrodes FE21 to FE24, respectively.

Here, the mass 340 is designed so that the beams B21 to B24 allow displacement of the mass 340 in the X-axis direction, and the beams B25 to B28 allows displacement of the mass 340 in the Y-axis direction as shown in FIG. 8A.

Accordingly, for example when acceleration in the X-axis direction is applied to the mass 340, the movable electrodes ME21 and ME22 formed integrally with the mass 340 are likewise displaced in the X-axis direction in connection with the displacement of the mass 340 in the X-axis direction. In this case, the distance between the movable electrode ME21 and the fixed electrode FE21 is increased or reduced while the distance between the movable electrode ME22 and the fixed electrode FE22 is reduced or increased. Furthermore, when acceleration in the Y-axis direction is applied to the mass 340, the movable electrodes ME23 and ME24 formed integrally with the mass 340 are likewise displaced in the Y-axis direction in connection with the displacement of the mass 340 in the Y-axis direction. In this case, the distance between the movable electrode ME23 and the fixed electrode FE23 is increased or reduced while the distance between the movable electrode ME24 and the fixed electrode FE24 is reduced or increased.

With this sensor, the variation of the distance between the respective electrodes as described above is detected as the variation of the electrostatic capacitance, and the variations in electrostatic capacitance in the X-axis direction and the Y-axis direction are converted to voltage values through the switched capacitor circuit shown in FIG. 6.

As described above, according to the semiconductor dynamic quantity sensor shown in FIGS. 8A and 8B, it is possible to detect the application of the dynamic quantities (acceleration) in the two orthogonal axis directions. However, the conventional sensor as described above adopts such a structure having a low degree of freedom that one mass is commonly supported by two kinds of beams to allow the displacements of the mass in the two axis directions.

Specifically, as shown in FIG. 8A, when displacement of the mass 340 in the X-axis direction is considered, the beams B21 to B24 are disposed to allow the displacement of the mass 340 in the X-axis direction. On the other hand, the other beams B25 to B28 are disposed to restrain the displacement of the mass 340 in the X-axis direction. Conversely, when the displacement of the mass 340 in the Y-axis direction is considered, the beams B25 to B28 allow the displacement of the mass 340 in the Y-axis direction whereas the beams B21 to B24 restrain the displacement of the mass 340 in the Y-axis direction.

As described above, the conventional semiconductor quantity sensor is designed so that the application of the dynamic quantity (acceleration) in the orthogonal two axis directions can be detected. However, the displacement of the mass in the one axis direction intervenes in the displacement of the mass in the other axis direction. This will be referred to as one axis intervening and reducing other-axis sensitivity. Therefore, in a conventional semiconductor dynamic quantity sensor, a reduction in other-axis sensitivity is unavoidable.

SUMMARY OF THE INVENTION

The present invention has been implemented in view of the foregoing situation, and has an object to provide a semiconductor dynamic quantity sensor which is designed to have a high degree of freedom and can detect a dynamic quantity with higher precision even when the dynamic quantity is applied in two orthogonal directions.

In order to attain the above object, according to a first aspect of the present invention, a semiconductor dynamic quantity sensor that has a mass mounted on a semiconductor substrate through beams and displaced in accordance with application of a dynamic quantity, and detects the dynamic quantity thus applied on the basis of variation of an electrical characteristic between movable electrodes formed integrally with the mass and fixed electrodes each of which is supported at one end thereof by the semiconductor substrate, is characterized in that the mass is divided into a plurality of masses arranged in series. The respective masses are connected to one another through connecting beams for allowing the masses to be displaced so as approach one another and move away from one another.

By adopting the mass structure described above for the semiconductor dynamic quantity sensor, at least one mass among the divided mass, both the ends of which are connected through the connecting beams, suffers no interference in displacement in the connecting direction thereof. In addition, the connecting direction of each mass is arbitrarily selected, and the masses thus connected can be designed so as to be displaceable in the direction orthogonal to the connecting direction. Therefore, according to the semiconductor dynamic quantity sensor having the above structure, the degree of freedom for design can be greatly enhanced, and even application of a dynamic quantity in orthogonal two axis directions can be detected with higher precision. Basically, the masses may be divisionally arranged in any divisional style (i.e., in any divisional arrangement). However, from the viewpoint of the property of the sensor, the mass is required to be divided in such a dividing style that each mass keeps higher rigidity than the connecting beams.

According to a second aspect of the present invention, the application of the dynamic quantity in the orthogonal two axis directions can be detected with higher precision without reducing other-axis sensitivity by adopting the following structures.

(a) The mass is divided into three masses (first to third masses) in series.

(b) The first and third masses located at both the ends of the mass are mounted on a semiconductor substrate through beams so as to be allowed to be displaced in the direction orthogonal to the connecting direction of the masses, and have movable electrodes formed integrally with the respective masses so that application of a dynamic quantity in the direction along which the masses are allowed to be displaced is detected.

(c) The second mass which is connected to the first and third masses through connecting beams so as to be located at the center position between the first and third masses has a movable electrode formed integrally with the second mass so that application of the dynamic quantity in the connecting direction of the masses which corresponds to the displacement-allowed direction.

According to a third aspect of the present invention, the semiconductor dynamic quantity sensor described above is designed so that an SOI substrate containing an insulating film and silicon film formed on a substrate such as a silicon substrate or the like is used as the semiconductor substrate, and each mass and the movable electrode and the fixed electrode formed integrally with the mass are formed from the silicon film, whereby a dynamic quantity sensor having stable and high detection precision can be easily manufactured by using a well-known semiconductor manufacturing process.

In this case, according to a fourth aspect of the present invention, the semiconductor dynamic quantity sensor is designed so that the silicon film remains around each mass and the movable and fixed electrodes on the semiconductor substrate so as to surround these elements. Therefore, the semiconductor dynamic quantity sensor can be easily handled while installing the sensor, etc.

Furthermore, in this case, according to a fifth aspect of the present invention, an electrode for fixing the potential of the silicon film remained around each mass and the movable and fixed electrodes on the semiconductor substrate so as to surround these elements to a constant value is equipped to the silicon film, so that each mass and the movable and fixed electrodes thereof can be electrically shielded by the silicon film. That is, the variation of the electrical characteristic between the movable electrode and the fixed electrode due to the displacement of the mass can be protected from external disturbance such as noise or the like.

According to a sixth aspect of the present invention, a cap for covering each mass and the movable and fixed electrodes on the semiconductor substrate is at least equipped to the formation portion thereof where the mass and the movable and fixed electrodes are formed. By equipping the cap, the mass and the movable and fixed electrodes having a fine structure can be mechanically protected.

In this case, according to a seventh aspect of the present invention, the cap is formed of conductive material or semiconductor material which is adhesively fixed to the semiconductor substrate through insulating adhesive agent at the contact site thereof with the semiconductor substrate. Therefore, each mass and the movable and fixed electrodes thereof can be electrically shielded by the cap. That is, in this case, the variation of the electrical characteristic between the movable and fixed electrodes due to displacement of the mass can be also protected from external disturbances such as noise or the like.

According to an eighth aspect of the present invention, the cap is equipped with an electrode for fixing the potential of the cap to a constant value, whereby the shield effect can be further enhanced.

When the above structures are combined with the structure of the fifth aspect of the present invention, the shield effect can be further enhanced.

According to a ninth aspect of the present invention, when the semiconductor dynamic quantity sensor is used as acceleration sensor, application of acceleration in the orthogonal two axis directions can be detected with higher precision without reducing the other-axis sensitivity.

BRIEF DESCRIPTION OF THE DRAWINGS

The above and other objects, features and advantages of the present invention will become more apparent from the following detailed description made with reference to the accompanying drawings. In the drawings:

FIGS. 1A–1C show a first preferred embodiment of a semiconductor dynamic quantity sensor, wherein FIG. 1B is a cross-sectional view taken along line IB—IB of FIG. 1A, and FIG. 1C is a cross-sectional view taken along line IC—IC of FIG. 1A;

FIGS. 3A to 3C show a second preferred embodiment of the semiconductor dynamic quantity sensor, wherein

FIGS. 4A to 4C show a third preferred embodiment of the semiconductor dynamic quantity sensor, wherein

FIGS. 5A and 5B show an example of a conventional uniaxial type semiconductor dynamic quantity sensor, wherein

FIGS. 8A and 8B show an example of a conventional biaxial type semiconductor dynamic quantity sensor, wherein

DETAILED DESCRIPTION OF THE PREFERRED EMBODIMENTS

Preferred embodiments according to the present invention will be described hereunder with reference to the accompanying drawings.

(First Embodiment)

Figure 1A:
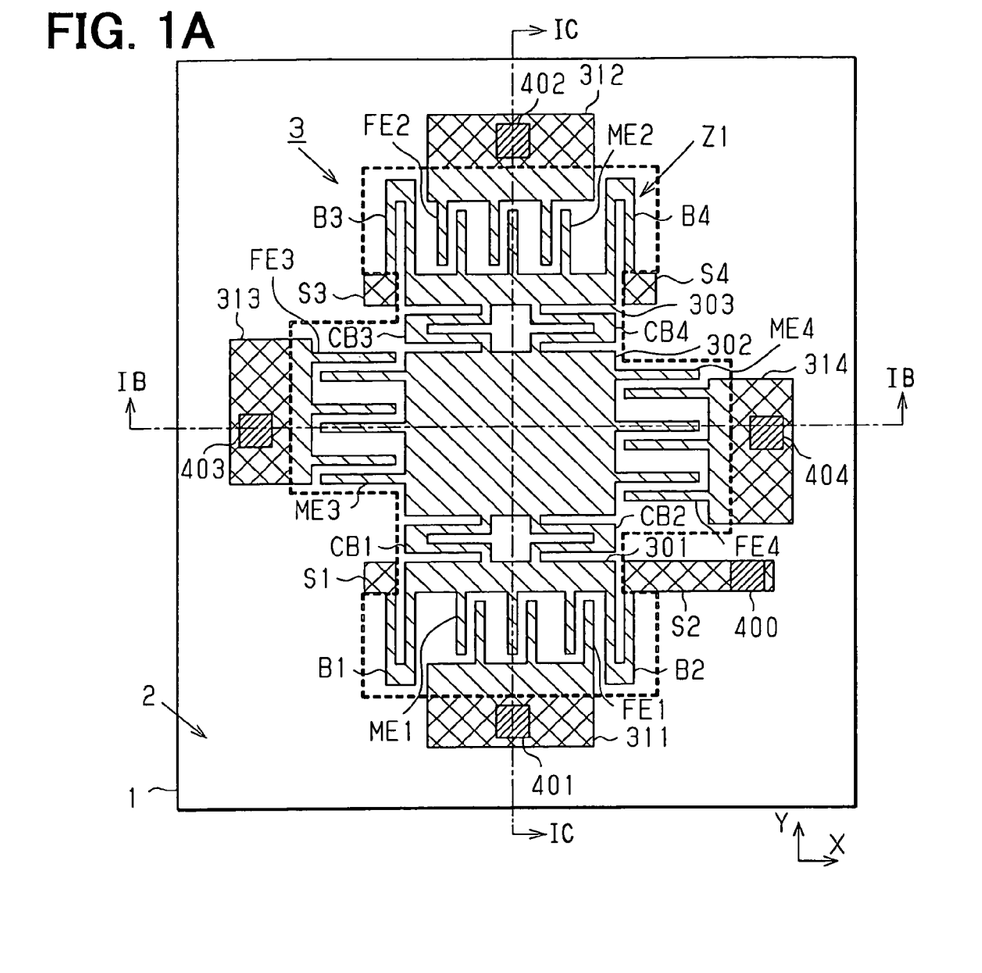
FIG. 1A is a plan view showing the structure of the sensor.

Referring to FIGS. 1A–1C, a first preferred embodiment of a semiconductor dynamic quantity sensor will be discussed. Like the conventional sensor shown in FIG. 8A, the semiconductor dynamic quantity sensor according to this embodiment detects a dynamic quantity (acceleration) in orthogonal two axis directions. However, according to the sensor of the first embodiment, a reduction of the other-axis sensitivity can be suppressed by adopting a mass structure and a beam structure discussed below.

The mass structure and the beam structure of the sensor according to this embodiment will be described with reference to FIGS. 1A to 1C. FIG. 1A is a plan view of the sensor element, FIG. 1B is a cross-sectional view taken along a line IB—IB of FIG. 1A and FIG. 1C is a cross-sectional view taken along a line IC—IC line of FIG. 1A.

As shown in FIGS. 1A to 1C, this sensor roughly comprises a semiconductor substrate (silicon substrate) 1, an insulating layer 2 and a semiconductor layer (silicon film) 3 formed on the insulating layer 2. That is, as in the case of the conventional sensor described above, the sensor of this embodiment is designed so that it can be easily worked by using a normal SOI substrate.

In this embodiment, the semiconductor layer 3 is basically subjected to patterning in such a pattern style as shown in FIG. 1A by a well-known photolithography technique or the like, and the insulating layer 2 is selectively etched and removed in an area Z1 indicated by a broken line of FIG. 1A to form a groove portion. That is, the semiconductor layer 3 is formed so as to be floated from the substrate 1 in the area Z1 corresponding to the groove portion and supported through the insulating layer 2 by the substrate 1 in the other area.

Specifically, masses (weight portions) 301 to 303 derived from the semiconductor layer 3, comb-shaped movable electrodes ME1 to ME4, each of which is formed integrally with each corresponding mass, fixed electrodes FE1 to FE4 each of which is supported at one end thereof so as to confront each movable electrode, and beams B1 to B4 and connecting beams CB1 to CB4 are formed within the area Z1. That is, in this embodiment, the masses 301 to 303 are divided to be arranged in series and connected to one another through the connecting beams CB1 to CB4. The masses 301 (first mass) and 303 (third mass) are supported by the beams B1 to B4. The masses 301 and 303 are divisionally arranged so that each mass at least keeps higher rigidity than the connecting beams CB1 to CB4. On the other hand, the beam fixing portions S1 to S4 and the anchor portions 311 to 314 derived from the semiconductor layer 3 are formed out of the area Z1.

The other ends of the respective beams B1 to B4 are supported by the beam fixing portions S1 to S4, and the fixed electrodes FE1 to FE4 are supported by the anchor portions 311 to 314, respectively. An electrode pad 400 formed of metal such as aluminum or the like is formed on the beam fixing portion S2 to output the potential of each of the movable electrodes ME1 to ME4. Furthermore, electrode pads 401 to 404 formed of metal such as aluminum or the like are formed on the anchor portions 311 to 314 to supply voltages to the fixed electrodes FE1 to FE4.

Here, as is apparent from FIG. 1A, the beams B1 to B4 are designed to allow displacement in the X-axis direction of each of the masses 301 to 303 connected to one another through the connecting beams CB1 to CB4 in FIG. 1A and restrain displacement in the Y-axis direction of the masses 301 and 303 connected to the connecting beams CB1 to CB4. Furthermore, with respect to the center mass 302 (second mass), as is apparent from FIG. 1A, the connecting beams CB1 to CB4 are designed to restrain the displacement of the mass 302 in the X-axis direction and allow only the displacement of the mass 302 in the Y-axis direction. However, since the connecting beams CB1 to CB4 are not supported by the semiconductor substrate 1, the connecting beams CB1 to CB4 and the masses 301 to 303 are integrally displaced in the X-axis direction when acceleration is applied to the sensor in the X-axis direction.

Accordingly, the connecting beams CB1 to CB4 do not intervene in the displacement of each of the masses 301 to 303 in the X-axis direction. In addition, among the masses 301 to 303, the center mass 302 which is particularly allowed to be displaced in the Y-axis direction in FIG. 1A is disposed to be dynamically independent of the beams B1 to B4 supported by the semiconductor substrate 1, so that the beams B1 to B4 do not intervene in the displacement of the center mass 302 in the Y-axis direction.

As described above, according to the semiconductor dynamic quantity sensor of this embodiment, even when acceleration is applied in any direction of the orthogonal two axis directions (X-axis direction and Y-axis direction), the beams B1 to B4 and the connecting beams CB1 to CB4 do not intervene in the displacement of the masses 301 to 303 to the other axis side, and the high other-axis sensitivity can be kept.

According to the sensor of this embodiment, the acceleration applied in the X-axis direction or the Y-axis direction in FIG. 1A in the following style through the mass structure and the beam structure as described above.

That is, when the acceleration in the X-axis direction is applied to each of the masses 301 to 303, the overall assembly of the masses containing the connecting beams CB1 to CB4 is displaced in the X-axis direction, and the movable electrodes ME1 and ME2 formed integrally with the masses 301 and 303 are likewise displaced in the X-axis direction in connection with the displacement of the overall mass assembly in the X-axis direction. In this case, the distance between the movable electrode ME1 and the fixed electrode FE1 is increased or reduced while the distance between the movable electrode ME2 and the fixed electrode FE2 is reduced or increased.

Furthermore, when the acceleration in the Y-axis direction in FIG. 1A is applied to each of the masses 301 to 303, in connection with the displacement in the Y-axis direction of the center mass 302, the movable electrodes ME3 and ME4 formed integrally with the center mass 302 are likewise displaced in the Y-axis direction. In this case, the distance between the movable electrode ME3 and the fixed electrode FE3 is increased or reduced while the distance between the movable electrode ME4 and the fixed electrode FE4 is decreased or increased.

According to the sensor of this embodiment, the variation of the distance between the electrodes as described above, which is caused by the application of the acceleration in the X-axis direction or Y-axis direction in FIG. 1A, is detected as variation of each electrostatic capacitance. The variation of the electrostatic capacitance as described above is converted to a voltage value through the switched capacitor circuit shown in FIG. 6 or the like.

Figure 2:
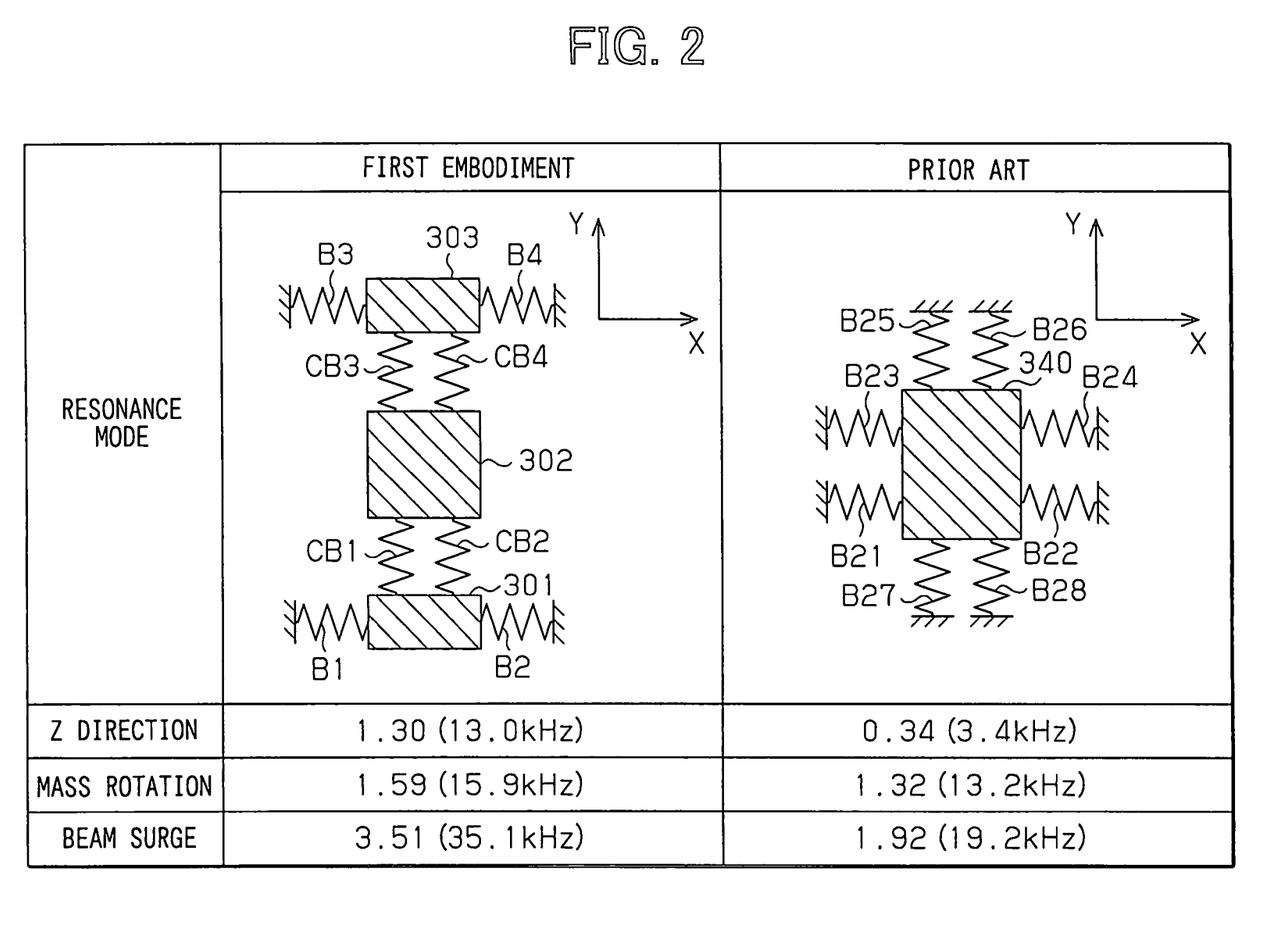
FIG. 2 is a table showing comparative model analysis results between the semiconductor dynamic quantity sensor according to the first preferred embodiment and a conventional semiconductor dynamic quantity sensor.

FIG. 2 is a table showing model analysis results between the semiconductor dynamic quantity sensor according to the first embodiment described above and the conventional semiconductor dynamic quantity sensor shown in FIG. 8 when these sensors are equivalently modeled.

In the table of FIG. 2, "Z direction" in the "resonance mode" column represents a resonance mode in the Z-axis direction, "mass rotation" represents a resonance mode relevant to the rotation of each mass when the Z-axis is set as the rotational axis, and "beam surge" represents a resonance mode relevant to vibration (wave) of the beams when the X-axis or Y-axis is set as the rotational axis. The numerical values in these items of the "resonance mode" column are relative values when the resonance frequency of the detection direction (X-axis direction and Y-axis direction) is normalized to "1". The numerical values in parentheses are actual frequencies for these items. As these relative values or resonance frequencies are higher than the value "1" or the resonance frequency in the detection direction, these resonance modes more hardly intervene in the displacement in the detection direction.

According to the model analysis results of FIG. 2, the sensor of this embodiment has higher relative values or resonance frequencies in any resonance mode than the conventional sensor. Particularly, these values in the "Z direction" and the "beam surge" are greatly higher than the conventional sensor. That is, according to the sensor having the mass structure and the beam structure of this embodiment, not only the other-axis sensitivity between the X-axis direction and the Y-axis direction, but also the other-axis sensitivity with respect to the Z-axis direction can be kept high. Furthermore, a "beam surge" rarely occurs in the detection direction, and thus the detection of acceleration in these detection directions can be performed with stable and high precision.

As described above, the semiconductor dynamic quantity sensor of this embodiment has the following excellent effects.

(1) The mass serving as the weight portion is divided into the masses 301 to 303 in series, and the respective masses 301 to 303 thus divided are connected to one another through the connecting beams CB1 to CB4. With respect to the masses 301 and 303 located at the end portions, these masses 301 and 303 are supported through the beams B1 to B4 by the semiconductor substrate 1 so that the displacement of these masses in the direction orthogonal to the connecting direction of the masses 301 to 303 is allowed. Furthermore, with respect to the mass 302 located at the center position among the masses 301 to 303, only the displacement of the mass 302 in the connecting direction is allowed by the connecting beams CB1 to CB4. By using the mass structure and the beam structure as described above, the application of the dynamic quantity (acceleration) in the orthogonal two axis directions can be detected with higher precision without reducing the other-axis sensitivity between these two axis directions.

(2) A normal SOI substrate containing a semiconductor substrate 1, an insulating layer 2 and a silicon layer 3 can be used in the manufacturing process, and the mass structure and the beam structure can be also easily achieved by using a well-known semiconductor process.

(3) As is apparent from the model analysis results shown in FIG. 2, not only the other-axis sensitivity between the X-axis direction and the Y-axis direction as the detecting direction, but also the other-axis sensitivity with respect to the Z-axis direction can be kept high. Furthermore, a "beam surge" rarely occurs in the detecting directions, so that the acceleration detection in the detecting directions can be performed with stable and high precision.

(Second Embodiment)

Figure 3A:
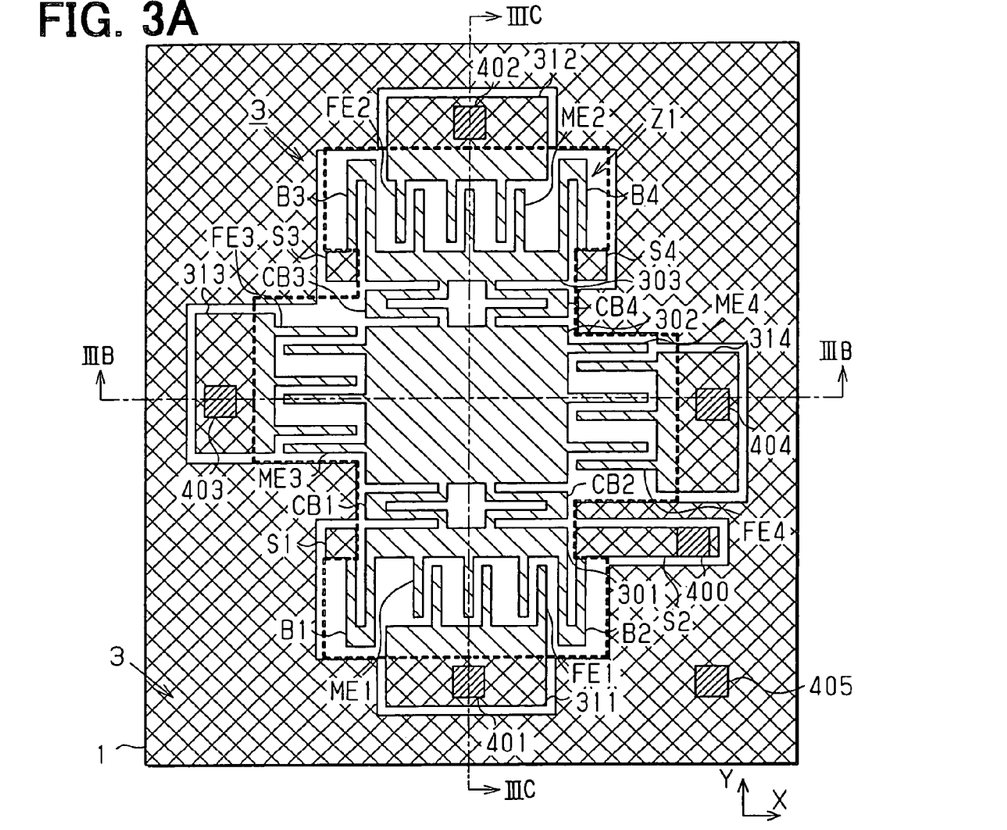
FIG. 3A is a plan view showing the structure of the sensor.
Figure 3B:
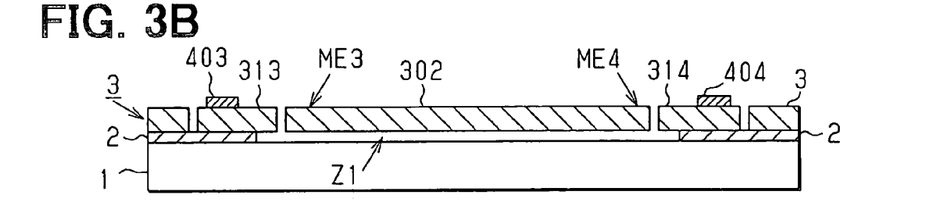
FIG. 3B is a cross-sectional view taken along line IIIB—IIIB of FIG. 3A.
Figure 3C:
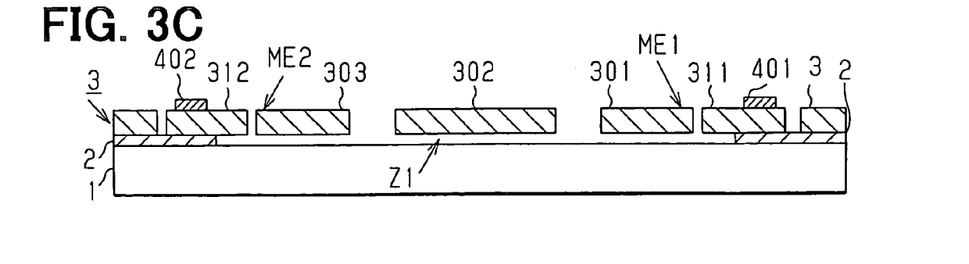
FIG. 3C is a cross-sectional view taken along line IIIC—IIIC of FIG. 3A.

Referring to FIGS. 3A–3C, a second preferred embodiment of the semiconductor dynamic quantity sensor will be discussed. As in the case of the sensor of the first embodiment, the semiconductor dynamic quantity sensor of this embodiment detects the dynamic quantity (acceleration) in the orthogonal two axis directions, and suppresses reduction of the other-axis sensitivity by using the mass structure and the beam structure described above. In addition, according to the sensor of this embodiment, the semiconductor layer 3 surrounds the respective masses, the movable and fixed electrodes and the anchor portions, and an electrode for fixing the potential of the semiconductor layer 3 to a constant value is equipped to the semiconductor layer 3, thereby enhancing the mechanical strength of the substrate and the electrical characteristic.

The structure of the sensor according to this embodiment will be described in detail with reference to FIGS. 3A to 3C. FIG. 3A is a plan view showing the sensor element, FIG. 3B is a cross-sectional view taken along line IIIB—IIIB of FIG. 3A, and FIG. 3C is a cross-sectional view taken along line IIIC—IIIC line of FIG. 3A. In FIGS. 3A to 3C, the same elements as shown in FIGS. 1A to 1C are represented by the same reference numerals, and duplicative descriptions thereof are omitted.

The semiconductor dynamic quantity sensor according to this embodiment has substantially the same basic structure as the first embodiment. That is, as shown in FIGS. 3A to 3C, the sensor roughly comprises a semiconductor substrate (silicon substrate) 1, an insulating layer 2 and a semiconductor layer (silicon layer) 3 formed on the insulating layer 2. The semiconductor layer 3 is basically subjected to patterning in such a pattern style as shown in FIG. 3A by a well-known photolithography technique or the like, and the insulating layer 2 is selectively etched and removed in an area Z1 indicated by a broken line of FIG. 3A to form a groove portion. That is, the semiconductor layer 3 is formed so as to be floated from the substrate 1 in the area Z1 corresponding to the groove portion and supported through the insulating layer 2 by the substrate 1 in the other area. The mass structure, the beam structure and the respective electrode structures, etc. within and out of the area Z1 are the same as the first embodiment shown in FIGS. 1A to 1C.

In this embodiment, however, the semiconductor layer 3 is left so as to surround the respective masses 301 to 303, the movable electrodes ME1 to ME4, the fixed electrodes FE1 to FE4 and further the anchor portions 311 to 314 as shown in FIGS. 3A to 3C. An electrode pad 405 formed of aluminum or the like is formed on the semiconductor layer 3 thus remaining to fix the potential of the semiconductor layer 3 to a constant value.

By adopting the above structure for the semiconductor dynamic quantity sensor, the respective masses 301 to 303, the movable electrodes ME1 to ME4, the fixed electrodes FE1 to FE4 and the anchor portions 311 to 314 can be electrically shielded by the residual semiconductor layer 3. That is, the variation of the electrostatic capacitance between the movable electrodes ME1 to ME4 and the fixed electrodes FE1 to FE4, which is caused by the displacement of each of the masses 301 to 303, can be protected from external disturbances such as noise or the like. Furthermore, the rigidity of the sensor itself is enhanced by the residual semiconductor layer 3, and the sensor can be easily handled in the work of installing the sensor.

As described above, according to the semiconductor dynamic quantity sensor of the second embodiment, the same effects (1) to (3) as the first embodiment can be achieved, and also the following new effects (4) and (5) can be achieved.

(4) The sensor itself is enhanced in rigidity by the residual semiconductor layer 3, and the sensor can be easily handled in the installing work of the sensor.

(5) The respective masses, the movable electrodes, the fixed electrodes and the anchor portions can be electrically shielded by the residual semiconductor layer 3. That is, the variation of the electrostatic capacitance between the movable electrodes and the fixed electrodes due to the displacement of the masses can be protected from noise or the like, and the dynamic quantity (acceleration) applied can be detected with stable and high precision.

(Third Embodiment)

Figure 4A:
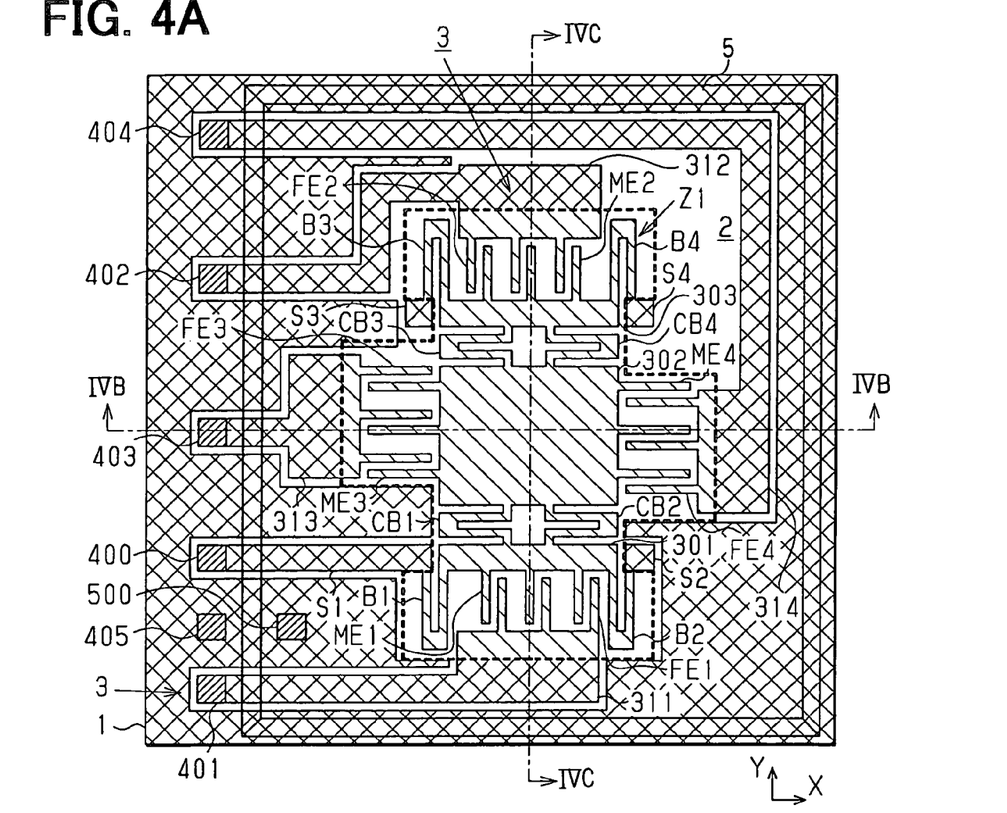
FIG. 4A is a plan view showing the structure of the sensor.
Figure 4B:
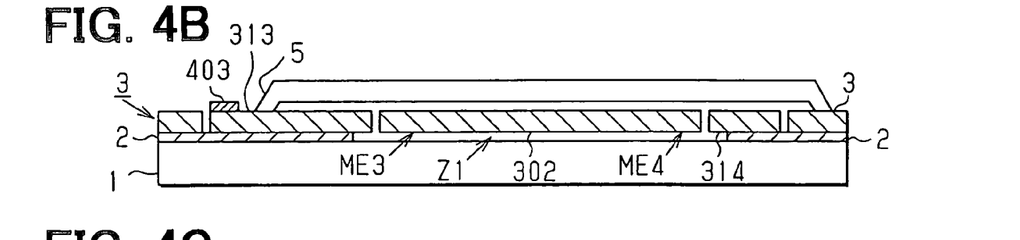
FIG. 4B is a cross-sectional view taken along line IVB—IVB of FIG. 4A.
Figure 4C:
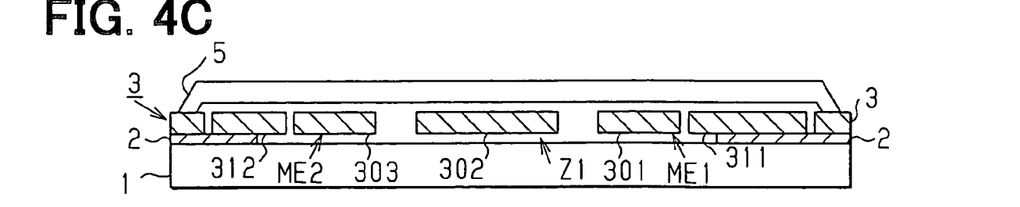
FIG. 4C is a cross-sectional view taken along line IVC—IVC of FIG. 4A.

Referring to FIGS. 4A–4C, a third preferred embodiment of the semiconductor dynamic quantity sensor will be discussed. As in the case of the sensors of the first and second embodiments, the semiconductor dynamic quantity sensor according to this embodiment detects the dynamic quantity (acceleration) in the two orthogonal axis directions and suppresses reduction of the other-axis sensitivity by adopting the mass structure and the beam structure described above. Furthermore, in the sensor of this embodiment, similarly to the sensor of the above second embodiment, the semiconductor layer 3 surrounds the respective masses, the movable electrodes, the fixed electrodes and the anchor portions, and an electrode for fixing the potential of the semiconductor layer 3 to a constant value is equipped to the semiconductor layer 3. Accordingly, the mechanical strength of the substrate and the electrical characteristic can be enhanced as described above. Furthermore, in the sensor of this embodiment, the respective masses, the movable electrodes, the fixed electrodes, etc. which have microstructures can be mechanically protected by equipping a cap 5 at the formation portion of the respective masses, the movable electrodes, the fixed electrodes and the anchor portions so as to cover the upper side of these elements.

The structure of the sensor according to this embodiment will be described in detail with reference to FIGS. 4A to 4C. FIG. 4A is a plan view showing the sensor element, FIG. 4B is a cross-sectional view taken along line IVB—IVB of FIG. 4A, and FIG. 4C is a cross-sectional view taken along a line IVC—IVC of FIG. 4A. In FIGS. 4A to 4C, the same elements as shown in FIGS. 1A to 1C and FIGS. 3A to 3c or the corresponding elements are represented by the same reference numerals, and the duplicative description thereof is omitted.

The basic construction inside the cap of semiconductor dynamic quantity sensor according to this embodiment is substantially identical to that of the second embodiment.

That is, as shown in FIGS. 4A to 4C, the sensor of this embodiment comprises a semiconductor substrate (silicon substrate) 1, an insulating layer 2 and a semiconductor layer (silicon layer) 3 formed on the insulating layer 2.

The semiconductor layer 3 is basically subjected to patterning in such a pattern style as shown in FIG. 4A by a well-known photolithography technique or the like, and the insulating layer 2 is selectively etched and removed in an area Z1 indicated by a broken line of FIG. 4A to form a groove portion. That is, the semiconductor layer 3 is formed so as to be floated from the substrate 1 in the area Z1 corresponding to the groove portion and supported through the insulating layer 2 by the substrate 1 in the other area. The mass structure, the beam structure and the respective electrode structures, etc. within and out of the area Z1 are the same as the first embodiment shown in FIGS. 1A to 1C or the second embodiment shown in FIGS. 3A to 3C. However, according to this embodiment, the electrode pads 400 to 404 are drawn out in one direction through the semiconductor layer 3 as shown in FIG. 4A because a cap 5 described later is equipped. An electrode pad 405 for fixing the potential of the residual semiconductor layer 3 is likewise disposed at the outside of the cap 5.

Next, there will be described the cap 5 which is disposed so as to cover the upper side of the area where the respective masses 301 to 303, the movable electrodes ME1 to ME4, the fixed electrodes FE1 to FE4 and the anchor portions 311 to 314 are formed.

In this embodiment, like the semiconductor layer 3, the cap 5 is formed of semiconductor material such as silicon or the like. The contact site of the cap 5 with the semiconductor substrate 1 (accurately, the semiconductor layer 3 on the semiconductor substrate 1) is adhesively fixed to the semiconductor substrate (semiconductor layer 3) with insulating adhesive agent or the like. Furthermore, an electrode pad 500 is also formed on the cap 5 to fix the potential of the cap 5 to a constant value.

The respective masses 301 to 303, the movable electrodes ME1 to ME4, the fixed electrodes FE1 to FE4 and the anchor portions 311 to 314 can be electrically shielded by adopting the structure as described above for the semiconductor dynamic quantity sensor. That is, in combination with the shield effect of the residual semiconductor layer 3, the variation of the electrostatic capacitance between the movable electrodes ME1 to ME4 and the fixed electrodes FE1 to FE4 which is caused by the displacement of each of the masses 301 to 303 can be more surely protected from external disturbance such as noise or the like. Furthermore, the upper side of at least the area where the respective masses 301 to 303, the movable electrodes ME1 to ME4 and the fixed electrodes FE1 to FE4 are formed is covered by the cap 5, so that these parts each having a microstructure can be mechanically protected.

As described above, according to the semiconductor dynamic quantity sensor of the third embodiment, the same effects (1) to (5) as the first or second embodiment, and also the following new effects (6) and (7) can be achieved.

(6) The cap 5 for covering the respective masses, the movable electrodes, the fixed electrodes, the anchor portions, etc. is formed of semiconductor material such as silicon or the like, and also the cap 5 is fixed to constant potential through the electrode pad 500. Accordingly, the electrical shield effect described above can be further enhanced.

(7) The upper side of at least the area where the respective masses, the movable electrodes and the fixed electrodes are formed is covered by the cap 5, so that the respective parts each having a microstructure can be mechanically protected.

(Other Embodiments)

In the second embodiment, the electrode pad 405 is formed on the semiconductor layer 3 which is left so as to surround the respective masses, the movable electrodes, the fixed electrodes and the anchor portions. However, no electrode pad 405 may be equipped on the residual semiconductor layer 3. Even in the case of this structure, the rigidity of the sensor itself is enhanced by the residual semiconductor layer 3, and the sensor can be easily handled in the installing work of the sensor. In this case, the electrical characteristic can be enhanced although the enhancement is less than the case where the electrode pad 405 is equipped.

In the third embodiment, the cap 5 is formed of semiconductor material such as silicon or the like. However, the cap 5 may be formed of conductive material such as copper, aluminum or the like. The cap 5 formed of a conductive material that can mechanically protect the respective masses, the movable electrodes, the fixed electrodes, the anchor portions, etc. and also protect them from external disturbance such as noise or the like as in the case of the third embodiment.

In the third embodiment, the electrode pad 500 for fixing the potential of the cap 5 to the constant potential is equipped to the cap 5. However, the upper side of the respective masses, the movable electrodes, the fixed electrode, the anchor portions, etc. may be covered by the cap 5 without forming any electrode pad 500. In this case, the covered parts can be electrically shielded and protected from the external disturbance such as noise or the like, although the effect is less than the case where the electrode pad 500 is equipped.

The cap 5 may be formed of insulating material such as resin or the like. The cap 5 formed of the insulating material can likewise mechanically protect the respective masses, the movable electrodes, the fixed electrodes, etc. In this case, any adhering method may be adopted for adhesion between the cap 5 and the semiconductor substrate 1 (accurately, the semiconductor layer 3 formed on the semiconductor substrate 1).

In the third embodiment, the cap 5 is equipped to cover substantially the entire semiconductor substrate 1, and the electrode pads 400 to 404 are drawn out in one direction through the semiconductor layer 3. However, the cap 5 may be equipped so as to selectively cover only the upper side of the area where the respective masses, the movable electrodes, the fixed electrodes, the anchor portions, etc. According to this structure, the draw-out of the electrode pads 400 to 404 can be easily performed, and the wire structure based on the semiconductor layer 3 can be simplified.

In the third embodiment, the cap 5 is equipped to the sensor structure of the second embodiment. However, the cap 5 may be applied to the sensor structure of the first embodiment.

In the embodiments described above, the direction along which the respective masses 301 to 303 are connected to one another through the connecting beams CB1 to CB4 is set to the Y-axis direction, and the direction orthogonal to the Y-axis direction is set to the X-axis direction. However, the axis directions containing the Z-axis direction may be arbitrarily set.

In the embodiments described above, the switched capacitor circuit shown in FIG. 6 is used as the detecting circuit. However, any method and any circuit may be basically used as the detecting method and the detecting circuit. The acceleration may be detected by using electrical characteristics other than the variation of the electrostatic capacitance variation, such as variation of electric field, resistance value or the like.

In the embodiments described above, the mass serving as the weight portion is divided into three masses 301 to 303 in series, and the masses thus divided are connected to one another through the connecting beams CB1 to CB4. However, the same effect can be achieved if the mass is divided into plural masses in series in such a style as to keep higher rigidity than the connecting beams and the plural masses are connected to one another through the connecting beams so that the masses are allowed to be displaced so as to approach to one another or move away from one another. That is, the structure of the connecting beams, the mass dividing style (for example, the number of divided masses), etc. are arbitrarily determined insofar as the above condition is satisfied, and the degree of freedom of the design can be kept high.

In the embodiments described above, the SOI substrate is used. However, the mass structure and the beam structure as described above can be implemented without using any SOI substrate as described above. With respect to the substrate 1, any substrate containing an insulating substrate may be used in place of the semiconductor substrate.

The embodiments described above relate to the biaxial semiconductor dynamic quantity sensor for detecting the acceleration. However, the present invention can be applied to a dynamic quantity sensor for detecting other dynamic quantities such as angular velocity, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An acceleration sensor comprising:
    a mass mounted on a semiconductor substrate through beams for being displaced in accordance with application of a dynamic quantity, wherein the dynamic quantity is detected on the basis of variation of an electrical characteristic between each of movable electrodes formed integrally with the mass and each of fixed electrodes which is supported at one end thereof by the semiconductor substrate,
    wherein the mass comprises a plurality of divided masses arranged in series, wherein the plurality of divided masses are connected together through connecting beams, which move independently, for permitting the plurality of divided masses to be displaced so as to approach one another and move away from one another,
    wherein the displacement of the mass can be detected in two axial directions orthogonal to each other.
2. The acceleration sensor according to claim 1, wherein:
    the plurality of divided masses comprise first to third masses in series to detect the application of the dynamic quantity in two orthogonal axis directions;
    the first and third masses located at both the ends of the mass are mounted on the semiconductor substrate through beams so as to be allowed to be displaced in a direction orthogonal to a connecting direction of the masses and have movable electrodes formed integrally with the respective masses so that application of dynamic quantity in the direction along which the plurality of divided masses are allowed to be displaced is detected; and
    the second mass which is connected to the first and third masses through connecting beams so as to be located at the center position between the first and third masses has a movable electrode formed integrally with the second mass so that application of dynamic quantity in the connecting direction of the plurality of divided masses corresponding to the displacement-allowed direction is detected.

3. An acceleration sensor comprising:
a mass mounted on a semiconductor substrate through beams for being displaced in accordance with application of a dynamic quantity, wherein the dynamic quantity is detected on the basis of variation of an electrical characteristic between each of movable electrodes formed integrally with the mass and each of fixed electrodes which is supported at one end thereof by the semiconductor substrate,
wherein the mass is comprised of a plurality of divided masses arranged in series, wherein the plurality of divided masses are connected together through connecting beams for permitting the plurality of divided masses to be displaced so as approach to one another and move away from one another,
wherein the semiconductor substrate comprises an insulating film and a silicon film formed on the semiconductor substrate, and each of the plurality of divided masses and the movable electrode and the fixed electrode formed integrally with the mass are formed from the silicon film.

4. The acceleration sensor according to claim 3, wherein the silicon film surrounds the plurality of divided masses and the movable and fixed electrodes.

5. The acceleration sensor according to claim 4, wherein the movable electrodes and the fixed electrodes are equipped with an electrode for fixing the potential of the silicon film to a constant value.

6. The acceleration sensor according to claim 5, further comprising a cap for covering the plurality of divided masses and the movable and fixed electrodes on the semiconductor substrate is equipped to a formation portion where the plurality of divided masses and the movable and fixed electrodes are formed.

7. The acceleration sensor according to claim 6, wherein the cap is formed of conductive material or semiconductor material which is adhesively fixed to the semiconductor substrate through insulating adhesive agent at a contact site thereof with the semiconductor substrate.

8. The acceleration sensor according to claim 7, wherein the cap is equipped with an electrode for fixing the potential of the cap to a constant value.

9. An acceleration sensor comprising:
a mass mounted on a semiconductor substrate through beams for being displaced in accordance with application of a dynamic quantity, wherein the dynamic quantity is detected on the basis of variation of an electrical characteristic between each of movable electrodes formed integrally with the mass and each of fixed electrodes which is supported at one end thereof by the semiconductor substrate,
wherein the mass comprises a plurality of divided masses arranged in series, wherein the plurality of divided masses are connected together through connecting beams for permitting the plurality of divided masses to be displaced so as to approach one another and move away from one another; and
a cap for covering the plurality of divided masses and the movable and fixed electrodes on the semiconductor substrate is equipped to a formation portion where the plurality of divided masses and the movable and fixed electrodes are formed.

10. The acceleration sensor according to claim 9, wherein the cap is formed of conductive material or semiconductor material which is adhesively fixed to the semiconductor substrate through insulating adhesive agent at a contact site thereof with the semiconductor substrate.

11. The acceleration sensor according to claim 10, wherein the cap is equipped with an electrode for fixing the potential of the cap to a constant value.

* * * * *